United States Patent
Kao et al.

(10) Patent No.: US 8,402,199 B2
(45) Date of Patent: *Mar. 19, 2013

(54) MEMORY MANAGEMENT SYSTEM AND METHOD THEREOF

(75) Inventors: Chien-Long Kao, Hsin Chu County (TW); Yi-Chih Hsin, Kao Hsiung (TW)

(73) Assignee: Sonix Technology Co., Ltd., Chupei, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,513

(22) Filed: May 22, 2012

(65) Prior Publication Data

US 2012/0233412 A1 Sep. 13, 2012

Related U.S. Application Data

(63) Continuation of application No. 12/194,225, filed on Aug. 19, 2008, now Pat. No. 8,205,031.

(51) Int. Cl.
*G06F 12/00* (2006.01)

(52) U.S. Cl. ............. 711/5; 711/4; 711/100; 711/104; 711/105; 711/111; 711/112; 711/147; 711/148; 711/154; 711/157

(58) Field of Classification Search ............ 711/22, 711/23, 100, 104, 105, 111, 112, 147, 148, 711/154, 157, 4–5
See application file for complete search history.

(56) References Cited

U.S. PATENT DOCUMENTS

| | | | |
|---|---|---|---|
| 5,396,619 A | 3/1995 | Walton | |
| 5,715,419 A | 2/1998 | Szczepanek et al. | |
| 6,341,318 B1 | 1/2002 | Dakhil | |
| 6,775,716 B2 | 8/2004 | Tojima et al. | |
| 7,441,054 B2 | 10/2008 | Wu et al. | |
| 8,205,031 B2 * | 6/2012 | Kao et al. | 711/5 |
| 2006/0149888 A1 | 7/2006 | Dong et al. | |

FOREIGN PATENT DOCUMENTS

| | | |
|---|---|---|
| CN | 1577292 A | 2/2005 |
| CN | 101034375 A | 9/2007 |
| JP | 56-118165 | 9/1981 |
| JP | 01-246649 | 10/1989 |
| JP | 05-108477 | 4/1993 |
| JP | 07-334420 | 12/1995 |

* cited by examiner

*Primary Examiner* — Tuan Thai
*Assistant Examiner* — Zhuo Li
(74) *Attorney, Agent, or Firm* — Muncy, Geissler, Olds & Lowe, PLLC

(57) ABSTRACT

The invention discloses a memory management system and a memory management method are disclosed. The memory management system includes a first memory, at least one secondary memory, and a memory management device. The first memory includes a normal access memory bank and at least one switching access memory bank. The secondary memory includes at least one secondary access memory bank corresponding to the switching access memory bank. The memory management device reads/writes the normal access memory bank or the secondary access memory bank.

12 Claims, 5 Drawing Sheets

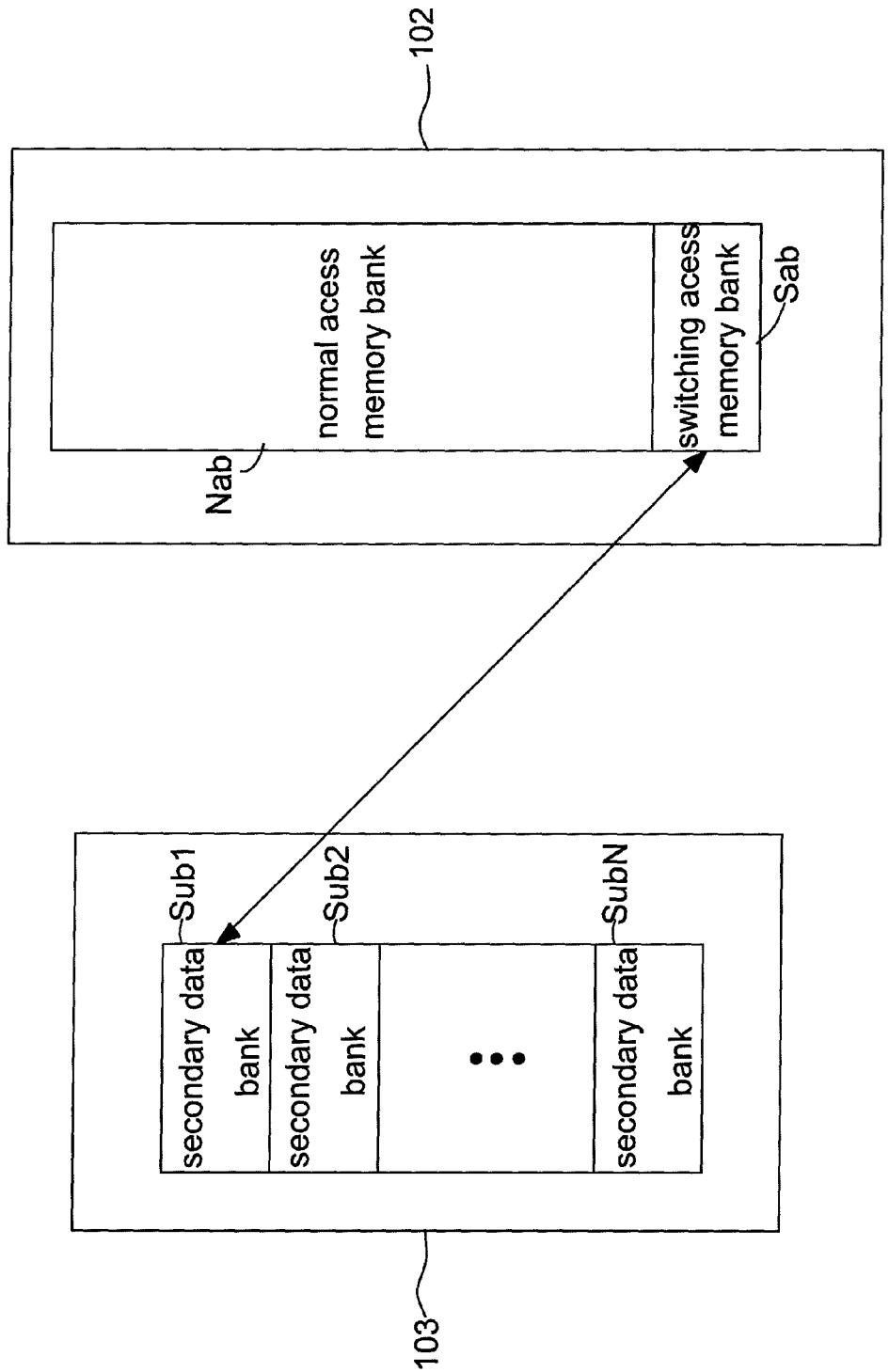

MEMORY MANAGEMENT SYSTEM AND METHOD THEREOF

CROSS REFERENCE TO RELATED APPLICATION

This application is a continuation application of application Ser. No. 12/194,225, filed on Aug. 19, 2008 now U.S. Pat No. 8,205,031.

BACKGROUND OF THE INVENTION

1. Field of the Invention

The present invention relates to memory access technology, and more particularly, to a memory management system and a method thereof.

2. Description of the Related Art

The addressable address range of a common microprocessor system is limited by the number of address lines in the address bus thereof. Taking the currently available digital system as an example, the addressable address range of the microprocessor is equal to two to the power of the number of the address lines. For example, the addressable address range of sixteen address lines is equal to two to the power of sixteen ($2^{16}$), 65536 addresses. However, due to considerations in the architecture and the cost, the number of address lines is reduced as much as possible in a most 8-bit microprocessor system. In most practical applications, the size of the memory in a microprocessor system is often limited by the addressable address range of the microprocessor system and cannot be increased. Therefore, the functionality of the microprocessor system is also limited.

Hence, the memory is a very important critical resource in a microprocessor system. The size of the memory is limited by the addressable address range of the microprocessor and the cost of the overall system. Therefore, under suitable considerations in the various factors, how to provide the largest memory resource utilized by the system becomes a very important issue.

BRIEF SUMMARY OF THE INVENTION

In light of the above-mentioned problem, one object of the invention is to provide a memory management system and a method thereof to reduce the number of physical address lines, increase the flexibility in memory expansion, and reduce the production cost.

One embodiment of the invention provides a memory management system. The memory management system includes a first memory, at least one secondary memory, and a memory management device. The first memory includes a normal access memory bank and at least one switching access memory bank. The secondary memory includes at least one secondary data bank corresponding to the switching access memory bank. The memory management device reads/writes the normal access memory bank or the secondary data bank according to at least one request signal. The memory management device moves the data in the secondary data bank to the switching access memory bank or writes data that are to be written into the secondary data bank via mapping the switching access memory bank when the request signal requests to read out or write in the secondary data bank.

Another embodiment of the invention provides a memory management system. The memory management system includes a memory switching controller, a first memory, at least one secondary memory, and a direct memory access controller. The memory switching controller generates a control signal according to at least one request signal. The first memory includes a normal access memory bank and at least one switching access memory bank. The plurality of access memory banks are switched according to the control signal, and the normal access memory bank or the switching access memory bank is read or written according to the control signal. The secondary memory includes at least one secondary data bank corresponding to the switching access memory bank. The direct memory access controller moves the data in the secondary data bank to the switching access memory bank or writes data that are to be written into the secondary data bank via mapping the switching access memory bank according to the control signal.

Another embodiment of the invention provides a memory management system. The memory management system includes a first memory, at least one secondary data bank, and a memory management device. The first memory includes a normal access memory bank and at least one switching access memory bank. The secondary data bank corresponds to the switching access memory bank. The memory management device reads/writes the normal access memory bank or the secondary data bank. When the memory management device reads/writes the secondary data bank, the memory management device moves the data in the secondary data bank to the switching access memory bank or writes data that are to be written into the secondary data bank via mapping the switching access memory bank.

Another embodiment of the invention provides a memory management method. The method comprises the following steps. First, a normal access memory bank and at least one switching access memory bank are provided. And, at least one secondary data bank that corresponds to the switching access memory bank is provided. Then, a request signal that comprises at least one address data, or at least one data that is to be written, or both of the above is received. Thereafter, according to the request signal, reading/writing either the normal access memory bank or the secondary data bank is determined. When the address provided by the request signal is within the addressing range of the normal access memory bank, the data of the normal access memory bank corresponding to the address provided by the request signal is read or the data to be written are written into the normal access memory bank. When the address provided by the request signal is within the addressing range of the secondary data bank, the data of the secondary data bank corresponding to the address provided by the request signal is moved to the switching access memory bank and then the data are read from the switching access memory bank or the data to be written are written into the secondary data bank via mapping the switching access memory bank.

The memory management system and the related management method are to partition the first memory into a normal access memory bank and at least one switching access memory bank. The secondary data bank of the secondary memory is read/written together with mapping the switching access memory bank. By such approach, the memory management system and the related management method according to the invention allow a user or designer expanding the number of addressable addresses and the memory space without limitation, even within the limited memory addressable range. Therefore, reducing the number of pins required for memory addressing, expanding the memory space flexibly, and reducing the overall system cost can be achieved.

BRIEF DESCRIPTION OF THE DRAWINGS

FIG. 1B shows a schematic diagram illustrating the memory space allocations of the first memory and the secondary memory shown in FIG. 1A;

DETAILED DESCRIPTION OF THE INVENTION

Figure 1A:
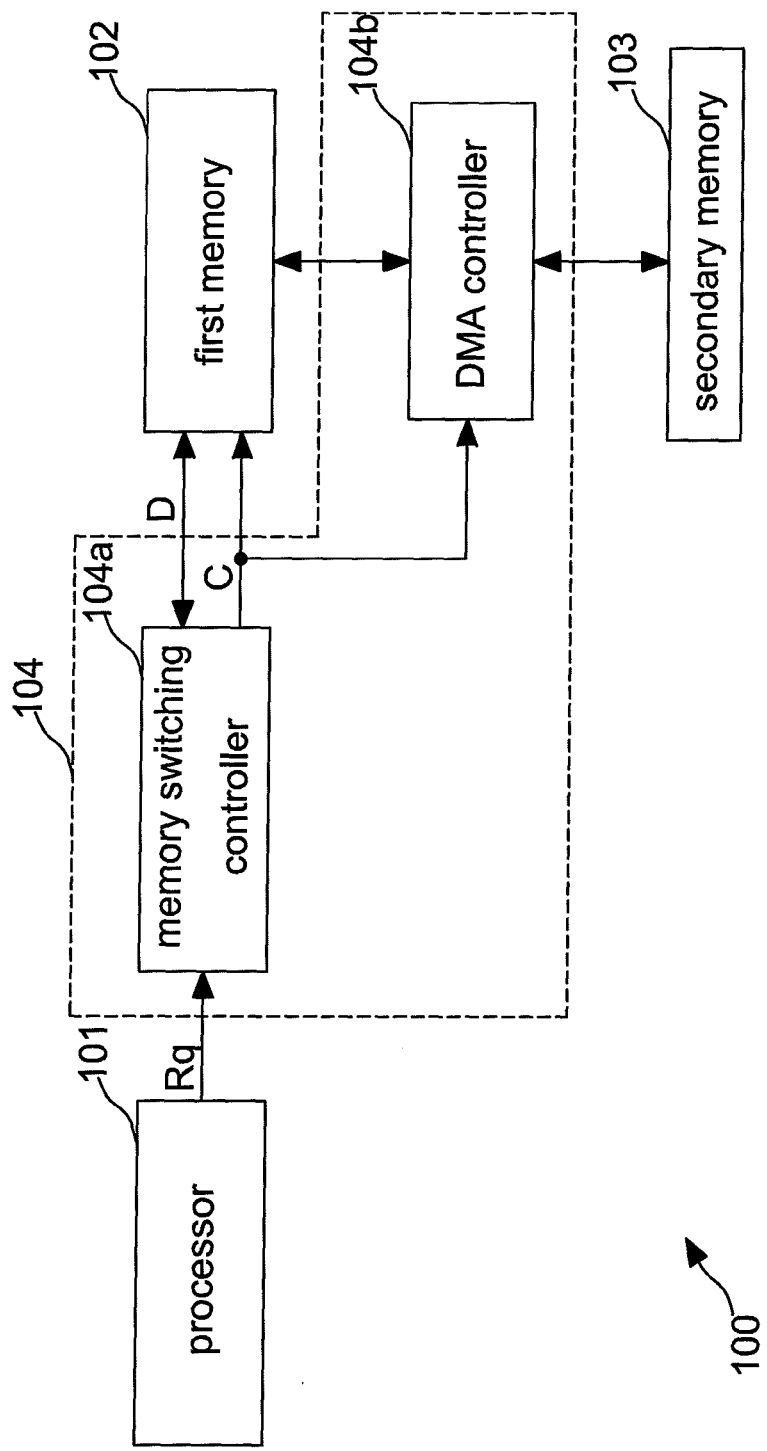
FIG. 1A shows a schematic diagram illustrating the memory management system according to one embodiment of the invention.

FIG. 1A shows a schematic diagram illustrating the memory management system according to one embodiment of the invention. The memory management system 100 includes a processor 101, a first memory 102, a secondary memory 103, and a memory management device 104.

The processor 101 can be a central processing unit (CPU), a microprocessor unit (MPU), a microprocessor control unit (MCU), or any other current existing processing device, or any future-developed processing device. The processor 101 issues a request signal Rq to access data in the memory.

The first memory 102 can be a static random access memory (SRAM), any current existing memory, or any future-developed memory. The first memory 102 includes a normal access memory bank and at least one switching access memory bank. The memory space of the first memory 102, shown in FIG. 1B, according to one embodiment of the invention includes a normal access memory bank Nab and a switching access memory bank Sab. Although the first memory 102 according to the present embodiment of the invention includes only one switching access memory bank Sab, the first memory 102 according to another embodiment of the invention can include a plurality of switching access memory banks Sab.

The secondary memory 103 can be a storage device selected from the group consisting of the following: flash memory, hard disk device, optical disc/disk, or any combination thereof, any other existing storage device, or any storage device to be developed in future. The secondary memory 103 includes at least one secondary data bank corresponding to the switching access memory bank. According to one embodiment of the invention shown in FIG. 1B, the secondary memory 103 includes N (N is a positive integer that is less than infinite) secondary data banks Sub1~SubN. The secondary data banks Sub1~SubN correspond to the switching access memory bank Sab, that is, the addresses of the secondary data banks Sub1~SubN are stored in the switching access memory bank Sab. When the system performs data swapping, these addresses can be used in data mapping to move the data in any of the secondary data banks Sub1~SubN to the switching access memory bank. Certainly, data can also be written into any of the secondary data banks Sub1~SubN via mapping the switching access memory bank Sab according to these addresses. Besides, the size of the secondary data banks Sub1~SubN is equal to the size of the switching access memory bank Sab. The program codes need to be used by the processor 101 can be stored in the secondary data banks Sub1~SubN.

The memory management device 104 reads (accesses) data from or writes data into the normal access memory bank Nab of the first memory 102 or any of the secondary data banks Sub1~SubN that correspond to the switching access memory bank Sab of the first memory 102. When the request signal Rq requests to read (access) any of the secondary data banks Sub1~SubN, the memory management device 104 moves the data of the secondary data banks Sub1~SubN designated by the address provided by the request signal Rq to the switching access memory bank Sab, or according to the data and the address provided by the request signal Rq, the memory management device 104 writes the data that are to be written by the processor 101 into one of the secondary data banks Sub1~SubN designated by the address via mapping the switching access memory bank. When the data requested by the request signal Rq are already stored in the switching access memory bank Sab, the memory management device 104 will access the data directly. Besides, the destination of the data read by the memory management device 104 is determined by the instruction of the request signal Rq. According to one embodiment of the invention, the request signal Rq can request that the data is transmitted to the processor 101 while the request signal Rq can also request that the data is transmitted to other devices within or outside (not shown in the figure) the system according to another embodiment of the invention.

The memory management device 104, shown in FIG. 1A, according to one embodiment of the invention includes a memory switching controller 104a and a direct memory access (DMA) controller 104b. The memory switching controller 104a generates a control signal C according to the request signal Rq. The DMA controller 104b determines how to access the secondary data banks Sub1~SubN according to the control signal C. The DMA controller 104b either moves the data in the secondary data banks Sub1~SubN to the switching access memory bank Sab or writes the data that are to be written by the processor 101 into the secondary data banks Sub1~SubN via mapping the switching access memory bank Sab.

Referring to FIGS. 1A and 1B, detail description about the operation principle of the memory management system according to embodiments of the invention will be given in the followings.

At first, when the processor 101 needs to access data (program code) D, the processor 101 transmits a request signal Rq to the memory switching controller 104a. The memory switching controller 104a generates a control signal C according to the address information provided by the request signal Rq. The control signal C is then received by the first memory 102 and the DMA controller 104b.

If the address provided by the request signal Rq is located within the normal access memory bank Nab of the addressable range of the first memory 102, the DMA controller 104b is not activated. The first memory 102 transmits the program code D corresponding to the address to the processor 101 via the memory switching controller 104a according to the control signal C.

On the other hand, if the address provided by the request signal Rq is located at the secondary data banks Sub1~SubN that is outside of the addressable range of the first memory 102, the memory switching controller 104a will determine if the program code D corresponding to the address is already stored in the switching access memory bank Sab of the first memory 102 or not. If yes, the program code D stored in the switching access memory bank Sab is transmitted to the processor 101 via the memory switching controller 104a. If not, the memory switching controller 104a utilizes the control signal C to drive the DMA controller 104b directly. Then, the DMA controller 104b stores the program code D stored in the secondary data banks Sub1~SubN corresponding to the address into the switching access memory bank Sab. The memory switching controller 104a then transmits the program code D stored in the switching access memory bank Sab to the processor 101. By such approach, the memory management system 100 according to the invention can increase the memory addressable range to be beyond the original memory addressable range limitation without increasing the physical pins required for addressing the memory.

Although the operation principle of the memory management system reading data according to the invention is described, those who are skilled in the art should be able to know how the memory management system operates when writing data based on the above-mentioned descriptions. Further details regarding the operation principle of data writing will not be given hereafter. Besides, the memory management device 104, the memory switching controller 104a, and the direct memory access controller 104b according to the embodiments of the invention can be implemented by software, firmware, hardware or any combination thereof.

Figure 2:
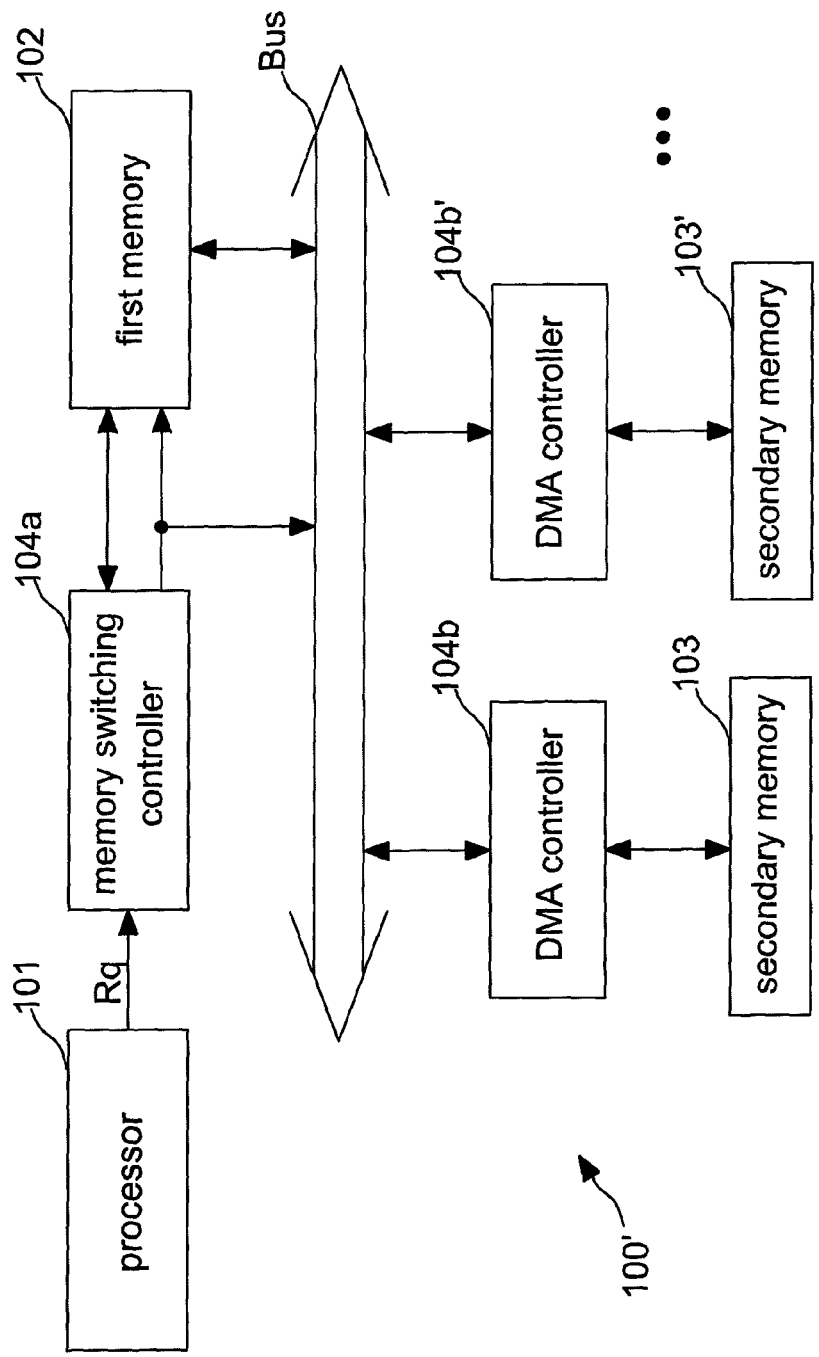
FIG. 2 shows a schematic diagram illustrating the memory management system according to another embodiment of the invention.

In another embodiment of the invention, shown in FIG. 2, the memory management system 100' can also utilize a bus "Bus", a plurality of direct memory access controllers 104b, 104b', . . . , and a plurality of secondary memories 103, 103', . . . , to perform data communications and read or write activities. Thereby, memory expansion can be achieved.

Figure 3A:
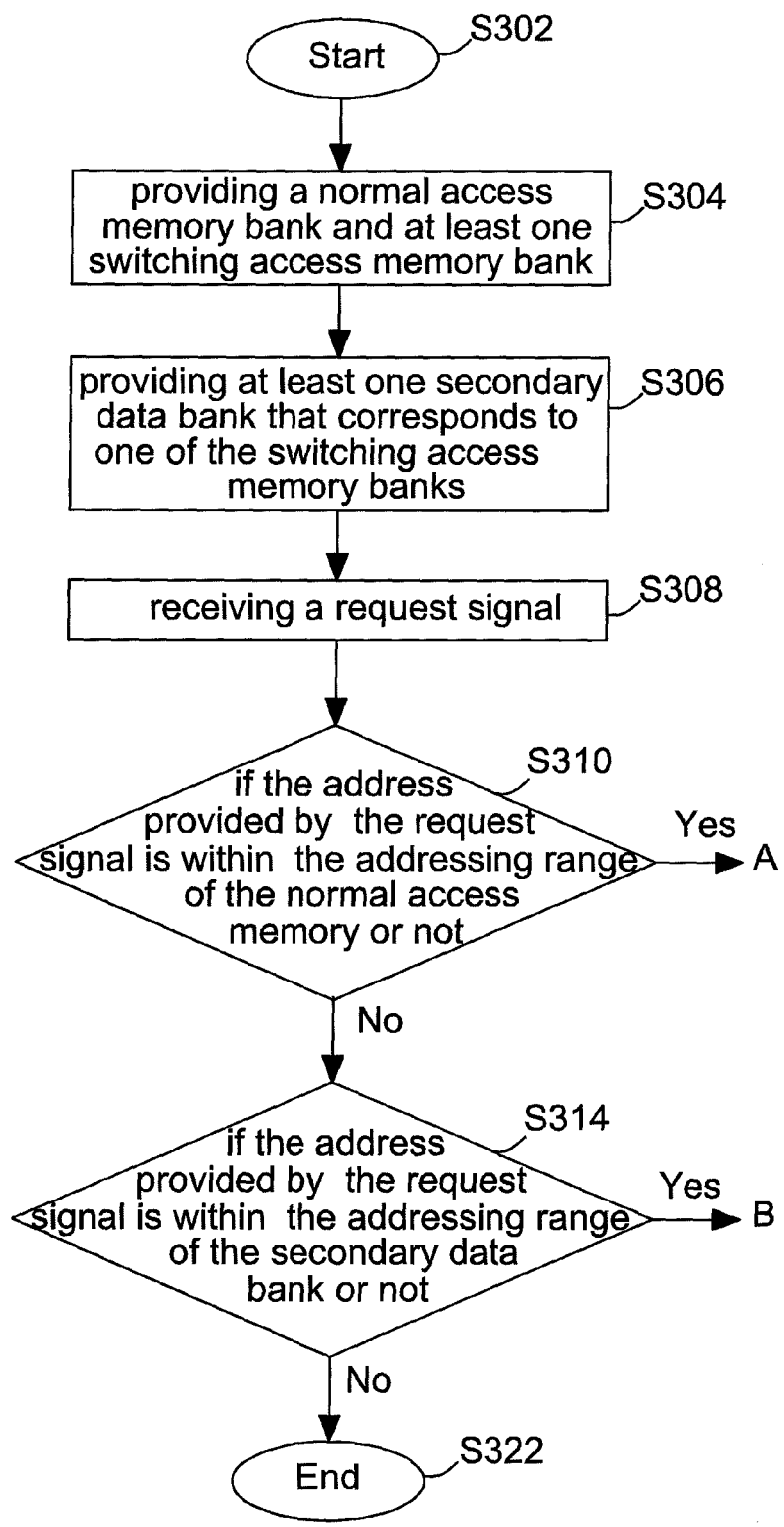
FIGS. 3A and 3B show flow charts illustrating the memory management method according to one embodiment of the invention.
Figure 3B:
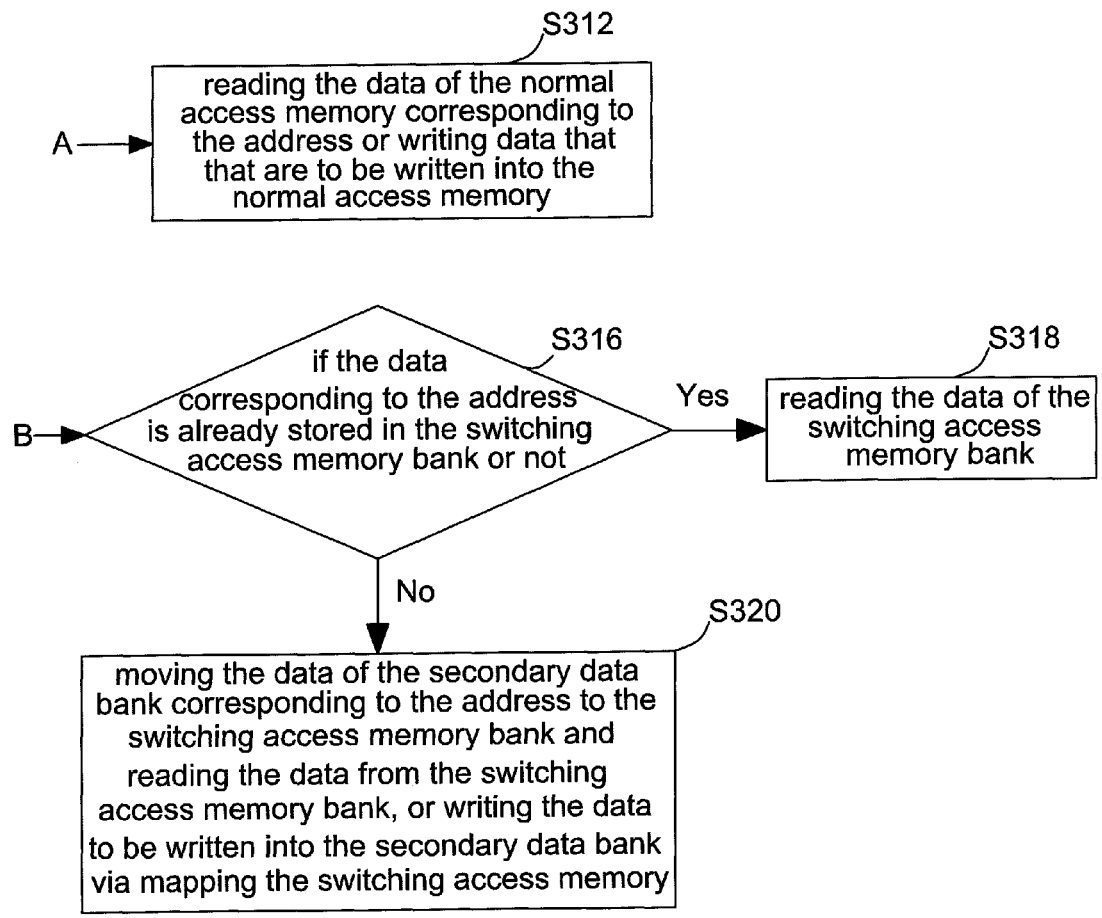

FIGS. 3A and 3B show flow charts illustrating one memory management method according to one embodiment of the invention. It comprises the following steps:

Step S302: Starting;

Step S304: providing a normal access memory bank and at least one switching access memory bank;

Step S306: providing at least one secondary data bank that corresponds to one of the switching access memory banks;

Step S308: receiving a request signal, that comprises at least one address data, or at least one data that is to be written, or both of the above;

Step S310: determining if the address provided by the request signal is within the addressing range of the normal access memory or not and then going to Step S312, if yes, or going to Step 314, if not;

Step S312: reading the data of the normal access memory corresponding to the address or writing data that are to be written into the normal access memory;

Step S314: determining if the address provided by the request signal is within the addressing range of the secondary data bank or not and then going to Step S316, if yes, or going to Step 322, if not;

Step S316: determining if the data corresponding to the address is already stored in the switching access memory bank or not and then going to Step S318, if yes, or going to Step 320, if not;

Step S318: reading the data of the switching access memory bank;

Step S320: moving the data of the secondary data bank corresponding to the address to the switching access memory bank and reading the data from the switching access memory bank, or writing the data to be written into the secondary data bank via mapping the switching access memory; and Step S322: End.

The memory management system and the related management method are to partition the first memory into normal access memory bank and at least one switching access memory bank. The secondary data bank of the secondary memory is read/written together with mapping the switching access memory bank. By such approach, the memory management system and the related management method according to the invention allow a user or designer expanding the number of addressable addresses and the memory space without limitation, even with the limited memory addressable range. That is, the existing space of the first memory is utilized as an exchanging bank to exchange data with the secondary memory without demanding more first memory space. Therefore, reducing the number of pins required for memory addressing, expanding the memory space flexibly, and reducing the overall system cost can be achieved.

What is claimed is:

1. A memory management system, comprising:
a first memory including a normal access memory bank and at least one switching access memory bank;
at least one secondary memory including at least one secondary data bank corresponding to the switching access memory bank; and
a memory management device for reading/writing the normal access memory bank or the secondary data bank according to at least one request signal, and the memory management device comprising a memory switching controller and a direct memory access controller;
wherein the memory switching controller stores the data into the switching access memory bank and writes the data stored in the switching access memory bank into the secondary data bank via the direct memory access controller when the request signal is designated to write the data to be written into the secondary data bank.

2. The memory management system according to claim 1, further comprising: a processor for issuing the request signal that comprises at least one address data, or data that are to be written, or both of the above.

3. The memory management system according to claim 2, wherein the memory management device determines to read or to write the normal access memory bank or the secondary data bank according to the address data.

4. The memory management system according to claim 1, wherein the memory switching controller transmits data stored in the normal access memory bank or the secondary data bank to a processor.

5. The memory management system according to claim 1, wherein the secondary memory is selected from the group consisting of the following: flash memory, hard disk device, optical disc/disk, and any combination thereof.

6. The memory management system according to claim 1, wherein the memory management device is implemented by one selected from the group consisting of the following: software, firmware, hardware or any combination thereof.

7. A memory management system, comprising:
a memory switching controller for generating a control signal according to at least one request signal;
a first memory including a normal access memory bank and at least one switching access memory bank, wherein the plurality of access memory banks are switched according to the control signal, and the normal access memory bank or the switching access memory bank is read out or written in according to the control signal;
at least one secondary memory including at least one secondary data bank corresponding to the switching access memory bank; and
a direct memory access controller for moving the data in the secondary data bank to the switching access memory bank or writing data that are to be written into the secondary data bank via mapping the switching access memory bank according to the control signal, wherein the memory switching controller moves the data stored in the secondary data bank to the switching access memory bank and outputs the data stored in the switching access memory bank via the direct memory access controller when the request signal is designated to access the data of the secondary data bank.

8. The memory management system according to claim 7, further comprising: a processor for issuing the request signal that comprises at least one address data, or data that are to be written, or both of the above.

9. The memory management system according to claim 8, wherein the memory management device determines to read or to write the normal access memory bank or the secondary data bank according to the address data.

10. The memory management system according to claim 7, wherein the memory switching controller transmits data stored in the normal access memory bank or the secondary data bank to a processor.

11. The memory management system according to claim 7, wherein the secondary memory is selected from the group consisting of the following: flash memory, hard disk device, optical disc/disk, and any combination thereof.

12. The memory management system according to claim 7, wherein the memory management device is implemented by one selected from the group consisting of the following:

software, firmware, hardware or any combination thereof.

* * * * *